(12) United States Patent
Fergusson

(10) Patent No.: US 6,536,375 B2
(45) Date of Patent: Mar. 25, 2003

(54) APPARATUS FOR RESTRAINING THE NECK AND/OR HEAD OF A FARM ANIMAL

(76) Inventor: Harry Alexander Fergusson, R.R. #6, Perth, Ontario (CA), K7H 3C8

( * ) Notice: Subject to any disclaimer, the term of this patent is extended or adjusted under 35 U.S.C. 154(b) by 0 days.

(21) Appl. No.: 10/096,493

(22) Filed: Mar. 13, 2002

(65) Prior Publication Data

US 2002/0139318 A1 Oct. 3, 2002

(30) Foreign Application Priority Data

Mar. 28, 2001 (CA) .............................................. 2342421

(51) Int. Cl.⁷ .............................................. A01K 15/04
(52) U.S. Cl. ...................................................... 119/734
(58) Field of Search .............................. 119/729, 730, 119/731, 732, 733, 734, 735, 737, 738, 750

(56) References Cited

U.S. PATENT DOCUMENTS

| | | | | |
|---|---|---|---|---|
| 1,676,568 A | * | 7/1928 | McCandless | 119/743 |
| 2,520,385 A | * | 8/1950 | Diehl | 119/743 |
| 3,051,127 A | * | 8/1962 | Norbury | 119/734 |
| 3,892,203 A | * | 7/1975 | Tieben | 119/731 |
| 4,100,886 A | * | 7/1978 | Wade et al. | 119/730 |
| 4,304,195 A | * | 12/1981 | Christophersen | 119/731 |
| 4,357,906 A | * | 11/1982 | Kratky | 119/731 |
| 4,513,690 A | * | 4/1985 | Waldron | 119/733 |
| 4,702,200 A | * | 10/1987 | Simington | 119/734 |
| 5,109,802 A | * | 5/1992 | Priefert | 119/730 |
| 5,263,438 A | * | 11/1993 | Cummings | 119/732 |
| 5,375,560 A | * | 12/1994 | Paul et al. | 119/734 |
| 5,908,009 A | * | 6/1999 | Cummings | 119/731 |

FOREIGN PATENT DOCUMENTS

| | | | |
|---|---|---|---|
| CA | 1030828 | 5/1978 | 119/60 |
| CA | 2077262 | 1/1995 | A01K/29/00 |
| CA | 2258367 | 7/2000 | A01K/1/06 |

* cited by examiner

*Primary Examiner*—Charles T. Jordan
*Assistant Examiner*—Susan L Piascik
(74) *Attorney, Agent, or Firm*—David J. French

(57) ABSTRACT

Apparatus for restraining the neck and/or head of a farm animal having a frame with a base, a top and opposed sides parts, which are spaced apart to allow at least the head of said animal to pass between these parts. Flexible belts extend between upper and lower locations connected to the frame and which are spaced respectively above and below the neck and head position of an animal to be treated, the belts having side portions connected to the frame sides by extensible means tending to hold these side portions apart. A fluid cylinder is attached to top ends of the belts so that when an animal has placed its head between the belt side portions these can be pulled inwardly against the side of an animal's neck or head to restrain movement of the animal.

6 Claims, 3 Drawing Sheets

APPARATUS FOR RESTRAINING THE NECK AND/OR HEAD OF A FARM ANIMAL

BACKGROUND OF THE INVENTION

1. Field of the Invention

The present invention relates to apparatus, often referred to as a "head gate", which is used for restraining the position of the head and/or necks of farm animals when administering medication, as by injections, or when performing other operations such as taking blood samples, tagging ears, removing horns, etc. The giving of injections in the neck is nowadays recommended since the neck has a large muscle mass that readily absorbs the medication. Meat packers also promote the needling in the neck since this area provides only the poorer cuts of meat.

Although the apparatus is principally designed for use with cattle, given suitable size adjustment it may be used for may other farm animals such as horses, buffalo, sheep, goats, etc.; the term "farm animals" is intended to cover at least this range of animals.

2. Prior Art

Presently, head gates used for restraining the heads and/or necks of animals such as cattle uses steel bars on opposite sides of the animal's necks. Such gates are shown for example in the following patents:

Can.Pat.No.1,030,828 to Kratky,
Can.Pat.No.2,077,262 to Halyung, and
Can.Pat.Application No.2,258,467 to Requate.

The steel bars presently used in head gates are uncomfortable for the animals. In many cases the design requires that the animal closes the gate by the animal trying to push its way between two bars, which form the edges of gates which rotate on hinges and come together around the head of the animal, the gates then holding the bars in the locked condition. Often, the animal slams into the bars, which is particularly stressful for the animal and also generates much noise. The spacing of the bars is crucial. They must be wide enough to allow the animal's head to pass between them but close enough together to allow the shoulders of the animal to rotate the bars bringing them against the animals' neck and locking the bars in place. For this reason there may be a need to adjust bars in some apparatus. With the bars close enough together to operate properly, some animals may refuse to place their heads between them, which slows the animal throughput. If the bars are too wide apart, the shoulders of a small animal can pass between the bars, with the result that the bars may close on the rib cage or mid section of the animal, which again is very stressful for the animal.

In some such apparatus the bars converge downwards so that if the animal loses its footing the bars tightly constrict the neck and may choke the animal.

The bars presently used do not immobilize the animal's neck effectively, so that when a needle is inserted into the neck the animal can lunge forward pinching the operator's fingers and breaking the needle.

It is an object of the invention to provide restraining means which is more comfortable than the steel bars used presently, and yet which holds the neck or head of an animal quite firmly while necessary operations are performed. Preferably, the apparatus is similar to known head gates in that it allows the animals to walk forwards through the apparatus, i.e. they do not need to be pulled out backwards.

SUMMARY OF THE INVENTION

In accordance with one aspect of the invention, apparatus for restraining the neck or head of a farm animal, comprises:

a frame having a base part and a top part and opposed side parts, these parts being spaced apart to allow at least the head of said animal to pass between these parts;

flexible means connected at lower and upper ends thereof to the frame, the flexible means including opposed side portions extending between upper and lower locations connected to the frame, the upper locations being closely spaced to each other above the neck and head position of an animal to be treated and the lower locations being closely spaced to each other below the neck position of the animal, and the side portions being connected to the frame side parts by extensible means tending to hold said side portions apart;

tensioning means for tensioning the flexible means by causing relative vertical movement of the upper end of the flexible means away from its lower end;

whereby, when an animal has placed its head between the side portions of the flexible means, these side portions can be pulled inwardly against the side of an animal's neck or head by vertical movement of the tensioning means so as to restrain movement of the animal.

The flexible means may be belts, i.e. flexible elements having a somewhat flattened cross-section. It will be understood that references to "head or neck" include the case where the flexible means are belts which are wide enough to hold both the head and the neck. The term "closely spaced" means at a spacing which is small relative to the neck width of an animal to be treated.

The lower ends of the flexible means may be anchored to a base part of the frame at the lower locations, and the upper part of the frame may have guides spaced on opposite sides of the side portions of the flexible means at these upper locations, the flexible means extending upwardly between the guides and having its upper end or ends connected to fluid cylinder means which provide said tensioning means.

In the preferred arrangement, the side portions of the flexible means are unconnected except at its upper end or ends, each of these side portions being carried by a door portion which is swingably mounted on a side of the frame, the door portions carrying the said upper and lower locations, the door portions being movable from a closed position in which the upper and lower locations of the side portions of the flexible means or belts are held close together, to an open position in which these side portions are sufficiently far apart for an animal to walk through the frame between these side portions and door portions.

Where the flexible means are belts these are preferably wide enough, for example over 3 inches in width, and up to 20 inches in width, as to apply even force to the animal's neck and to avoid the painful pressure points, bruising and damage caused when the existing head gate assemblies force small diameter steel tubing against the animal's head and neck. The force applied through these means virtually immobilizes the animal and also reduces the possibility of the animal falling.

The flexible means may alternatively be constituted by chains which are contained in flexible tubes such as rubber hoses, at least in those regions which contact the animal.

The apparatus preferably further comprises a latch for normally holding the door portions in the closed condition, and foot operated means for releasing the latch and allowing the door portions to open and an animal to proceed through the frame.

The hydraulic cylinder means may be disposed so that when retracted it exerts a component of force tending to close the door portions when these portions have been opened to allow an animal to pass through, whereby after the animal is treated and the tension applied by the cylinder means has been relaxed to allow the door portions to open, the cylinder means may be re-energized to close the door portions. The cylinder means is then again extended to allow the belts or other flexible means to open and admit another animal's head and neck.

The cylinder means may be a single hydraulic or pneumatic cylinder pivotally mounted at the top of the frame to accommodate outwards movement of the belts or flexible means as the door portions open. Alternatively, the cylinder means may include a first, generally vertical cylinder means for pulling the flexible means upwardly, the first cylinder means being mounted on a support moveable by second cylinder means in a horizontal direction, whereby the first cylinder means can be moved outwardly from the frame by the second cylinder means to stretch out an animals's neck. Both cylinder means may be retracted after the door portions have been opened in order to close the door portions.

Normally, the frame forms one end of an enclosure, the sides of which enclosure provide between them a walkway for animals approaching the door portions of the apparatus.

Where the flexible means are belts, these may be provided with at least one aperture for allowing treatment of an animal at a specific location determined by the position of the aperture.

BRIEF DESCRIPTION OF THE DRAWINGS

A preferred embodiment of the invention will now be described by way of example with reference to the accompanying drawings, in which.

DETAILED DESCRIPTION

Figure 1:
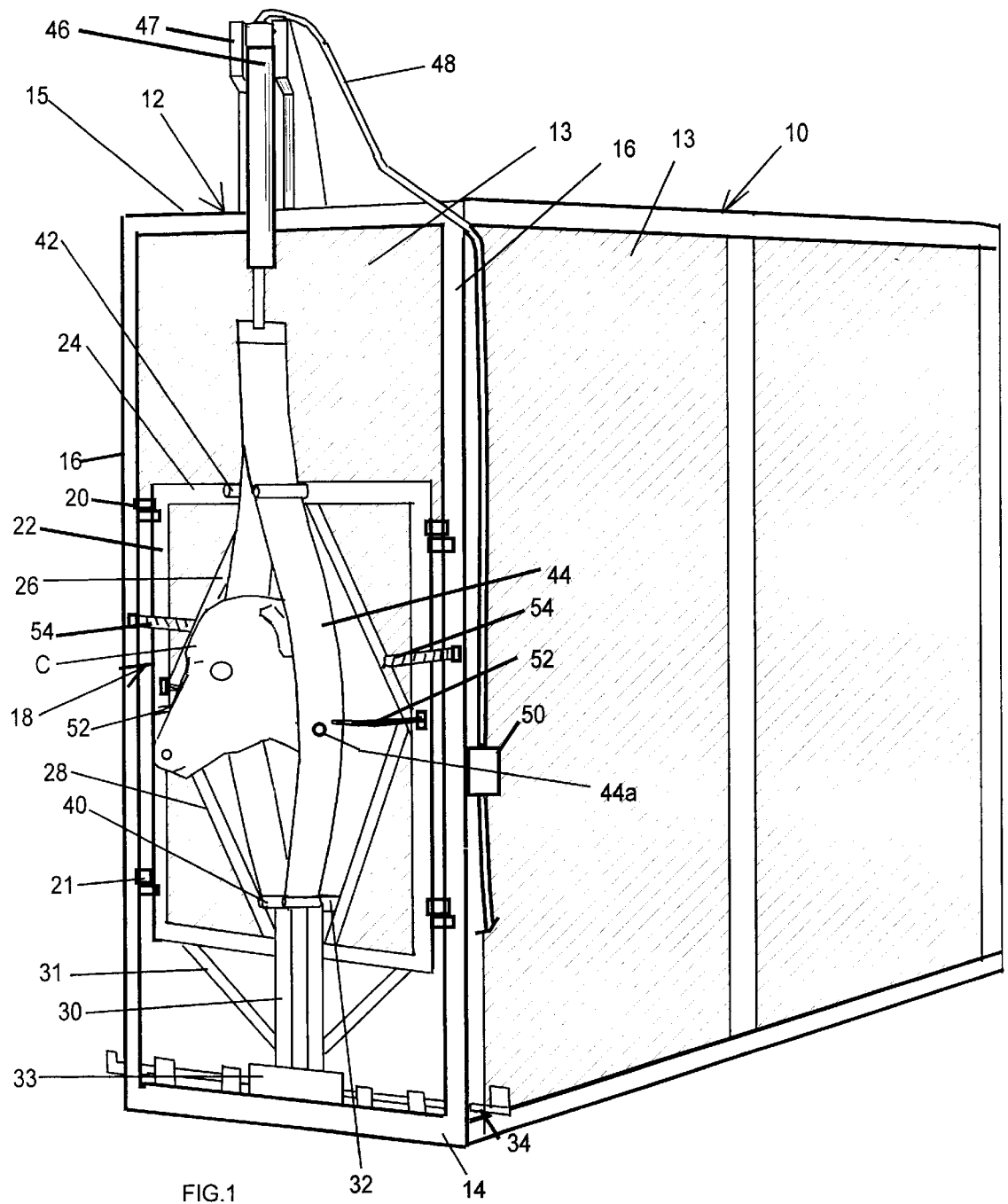
FIG. 1 is a perspective view of apparatus in accordance with the invention.
Figure 2:
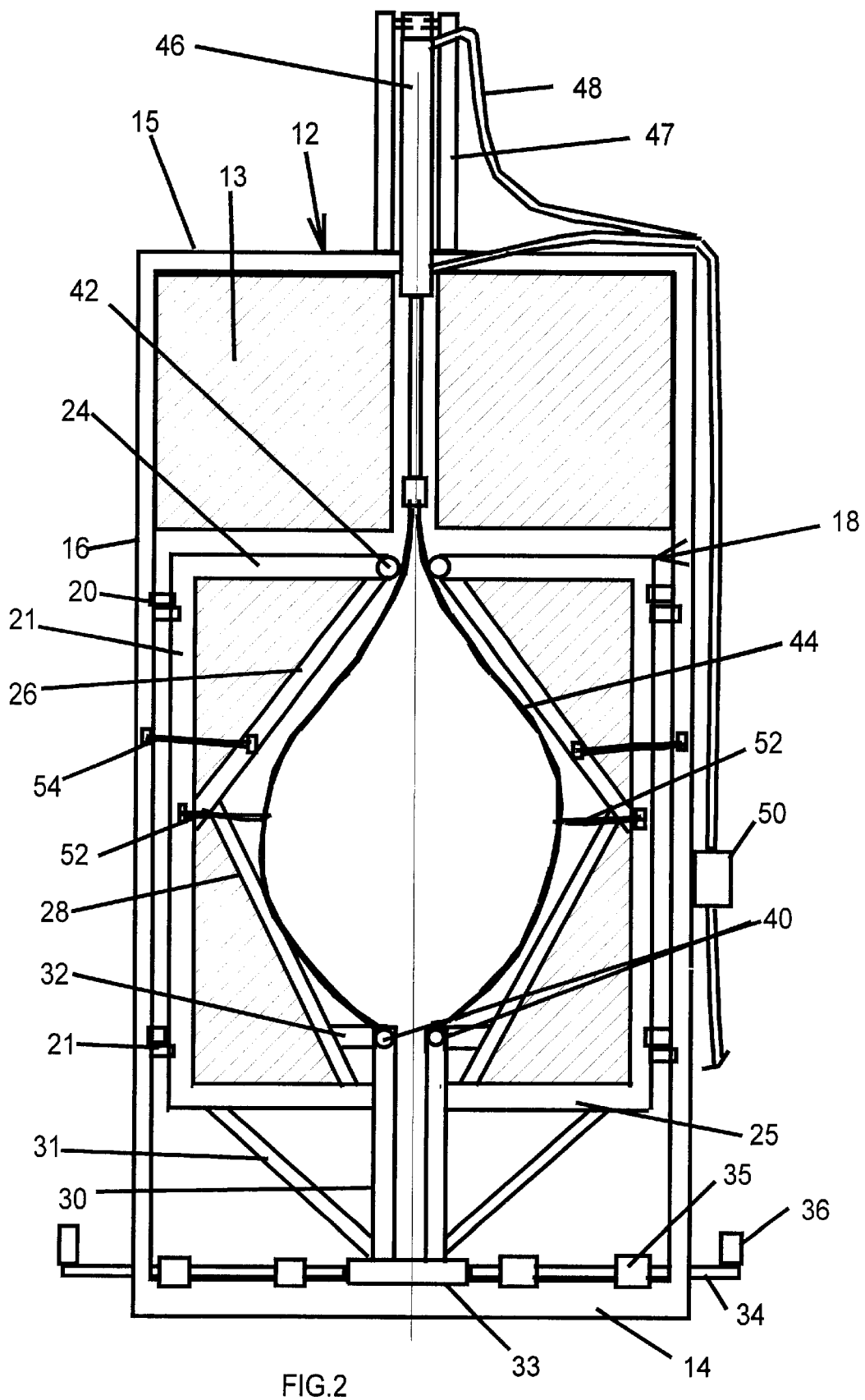
FIG. 2 is a view of the frame at the exit end of the apparatus.

As shown in FIGS. 1 and 2, the apparatus includes an upright frame which, in plan view, is of generally U-shaped, rectangular form having two opposed side portions 10 and an end portion 12. The frame is constructed largely of welded square-section steel tubing, to form a rigid self-supporting structure. The two side portions 10 are simple walls which enclose a walkway for animals, the animals being guided to the exit end frame portion 12 which has the head gate of this invention. The side portions 10 and most of the end portion 12 are covered in plastic sheeting 13, or solid wood or metal sheeting, to exclude light; animals entering the frame can see light through a central part of the frame end 12 and are encouraged to put their heads into the open central area of this which effectively forms the head gate, as will be described. Conveniently, the open or rear end of the frame may be placed against a door frame of a barn or similar enclosure, so that animals are forced to walk between the wall frame portions 10 in seeking the light which is visible through the end frame portion 12.

The end frame 12, shown in FIG. 2, has a base 14, a top 15, and upright side members 16, all rigidly welded together. Two gate or door portions 18 occupy the central part of the frame 12, each being hinged by upper and lower hinges 20 and 21 to one of the side members 16. The door portions 18 are formed of steel tubing welded together, and each have an outer upright member 22, upper and lower horizontal bars 24, 25, an upper sloping member 26 which connects the center of member 22 to member 24 at an upper inner corner of the door portion, and a lower sloping member 28 which has an upper end connected adjacent the outer end of the member 26 and a lower end connected to the inner end of member 25. The door portions also include lower vertical members 30 extending from above bar 25 down to near ground level, and having their lower ends braced by sloping members 31. The door portions also include short horizontal members 32 which join the top ends of members 30 to members 28. This construction provides a generally central, intermediate recessed area for each door portion which is bounded by members 26, 28, and 32, and which, when the door portions are closed, provides an open area for the location for the head gate-type mechanism to be described.

The lower ends of members 30 provide a lower extension of each door portion and these extensions cooperate with a latch plate 33, such that the members 30 are held against outwards movement by the plate when it is in its raised position as in FIG. 2. The latch plate 33 is controlled by a shaft 34 carried by bearings 35 and which extends across the base of the frame, having a foot pedal 36 at each end. Either of the foot pedals 36 may be depressed to rotate the shaft 34 and lower the latch plate 33, and this allows the door portions 18 to hinge outwardly from the closed positions shown, in which they are co-planar with the frame portion 12, to open positions extending outwardly at right angles to this plane.

The lower inner corners of the door portions 18, constituted by the junctions of members 30 and 32, each have an anchor bar 40 extending perpendicularly outwardly from the plane of the door portion, and the upper inner corners of the door portions each have a guide bar 42 extending outwardly in similar manner. In accordance with the invention, flexible belt means are provided including two belt side portions 44, each anchored at its lower end to one of the anchor bars 40, and each extending up the respective door portions and passing between the guide bars 42 at the upper inner corners of the door portions. The belt portions at their upper ends are connected to the cylinder rod of a hydraulic cylinder 46, pivotally mounted on the top of frame 12 by supports 47 and connected to supply hoses 48, the hydraulic fluid for which is controlled by a valve 50 mounted on the side of the frame. Intermediate side portions of the belts 44 are connected by extensible means 52 to the centers of the sides of the door portions, and these extensible means, which may be elastic bungee-type cords, serve to normally hold these intermediate portions of the belts apart, providing space for an animal to insert its head and neck between the belts and within the recessed areas of the door portions. In addition, extensible means 54, which are preferably springs, act between the sides of the frame and the door portions tending to pull these door portions into the open position when the latch plate 33 is released. Clearly, the tensioning means 52 holding the belts could be directly connected to the frame sides.

For use with cattle, the lower ends of the belts, anchored by bars 40, are about 15 to 30 inches above ground level, and the upper guides 42 for the belts are between about 4 and 7 feet, and preferably about 6 feet, above ground level. For sheep the lower ends of the belts may be only 6 inches above ground level, while for caribou the upper guides 42 would need to be about 9 to 10 feet high to avoid the antlers. The bars 40 and guides 42 are closely spaced, e.g. between about 1 to 3 inches apart, although wider spacing may be used for large animals.

The belts 44 may be made from rubber coated nylon conveyor type belting, having a width between about 3 and about 20 inches. Preferably, a hole or notch is provided in a wide belt to accommodate the animal's ears, and one or more apertures 44a may also be provided in a belt or both belts to provide a precise location for an injection. In this way a meat packer can know precisely where an injection was given.

The hydraulic fluid for the cylinder 46 may be provided by a farm tractor parked several meters from the apparatus, which allows the operator to be sufficiently far away from the animal to relieve the stress which sometimes comes from the animal's interaction with humans. The hydraulic power is delivered via the control valve 50. However, this apparatus may also use a pneumatic cylinder or cylinders where compressed air is available.

In operation, animals such as a cow C are led into the passageway between the frame wall portions 10 while the head gate parts are in the positions shown in FIGS. 1 and 2, with the door portions closed, the cylinder 46 extended, and the belt side portions 44 held open by extensible means 52. The animal is encouraged to put his head through the space between the side portions of the belts by the fact that this is one area where he can see clear light. At this point the valve 50 is operated to energized the cylinder 46, pulling up the belts between the guides 42 and tensioning these so that the side portions come against the sides of the animal's neck and/or head and immobilize this. When this happens, the animal soon realizes that struggling is futile and stands quietly, giving little stress to the animal and to the operator.

After the necessary work, such as an injection, has been done, the cylinder 46 is extended, releasing the animal's neck, and the foot pedal 36 is operated to allow the latch plate 33 to release the door portions which are pulled open by extendible means 54, allowing the animal to move forward between the door portions. After the animal has passed through, the cylinder 46 can again be retracted; the fact that this is now operating on the belts while these are in a forward position, with the cylinder tilted, means that this action pulls the door portions closed, where they are automatically latched by the latch plate 33. The cylinder 46 is extended again to bring the parts to the initial position for the next animal.

With this apparatus, there is no need for constant adjustment of restraining bars for differently sized animals as with present head gates; with this system the position of the belts is adjusted by extending or retracting the cylinder 46. Also, there is no possibility of the locking mechanism becoming jammed, and the system thus avoids delays.

The broad restraining belts that are used virtually immobilize the head and neck of the animal for procedures such as ear tagging, removing horns, treating eyes, installing bull rings, and checking for teeth and mouth problems. The broad restraining belts eliminate the painful pressure points that are caused when small diameter restraining bars are forced against an animal's neck as with other gate assemblies. Also, with the neck and head held by the belts it is nearly impossible for the animal to fall.

Figure 3:
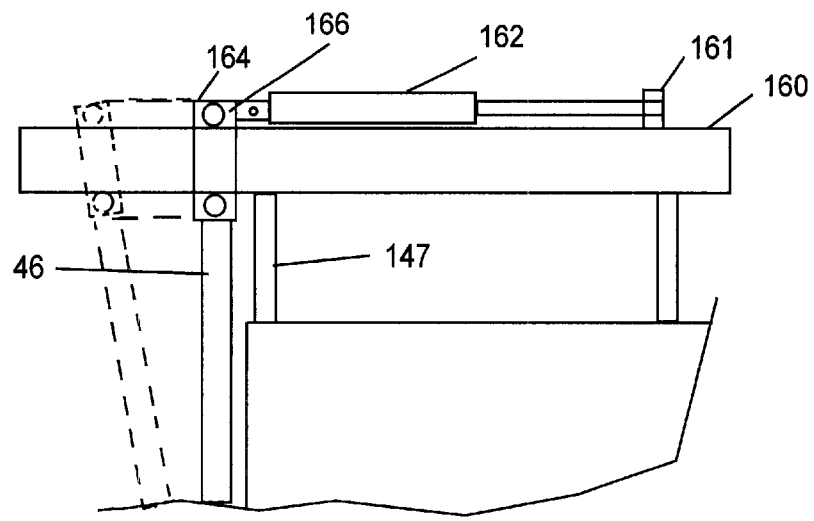
FIG. 3 shows a fragmentary side view of a variation of the structure at the top of the frame having a second cylinder.

FIG. 3 shows an alternative construction for the top of the frame, in which supports 147 hold a fore-and-aft extending beam 160. A bracket 161 on this beam holds one end of a second hydraulic piston and cylinder combination 162, the other end of which is connected to a carriage 164 having upper and lower rollers 166 which allow the carriage to move along the beam. The lower end of the carriage pivotally supports the first hydraulic cylinder 46.

This arrangement operates as follows. Initially the door portions 18 are closed, the cylinder 46 is extended and the horizontal cylinder 162 is retracted, while the animal is led to put its head and neck between the flexible belts 44. The cylinder 46 is then retracted, tightening the belts against the animal's neck, and then the cylinder 162 is extended to move out the carriage 164 and thus to stretch out the animal's neck so that it is in the best position for injections, etc. After the necessary work has been done, the cylinder 46 is extended, and the latch plate 33 operated to release the door portions 18 which open and allow the animal to pass through. In order to close the door portions, both cylinders are retracted; cylinder 46 is then extended to return parts to the initial position.

The use of guides 42 may not be essential; it may be sufficient in some cases merely to have the upper portions of the belts 44 extend straight to where they are attached to the rod of cylinder 46. Connections to the cylinder rod will thus be considered as the closely spaced upper locations of the belt means.

Figure 4:
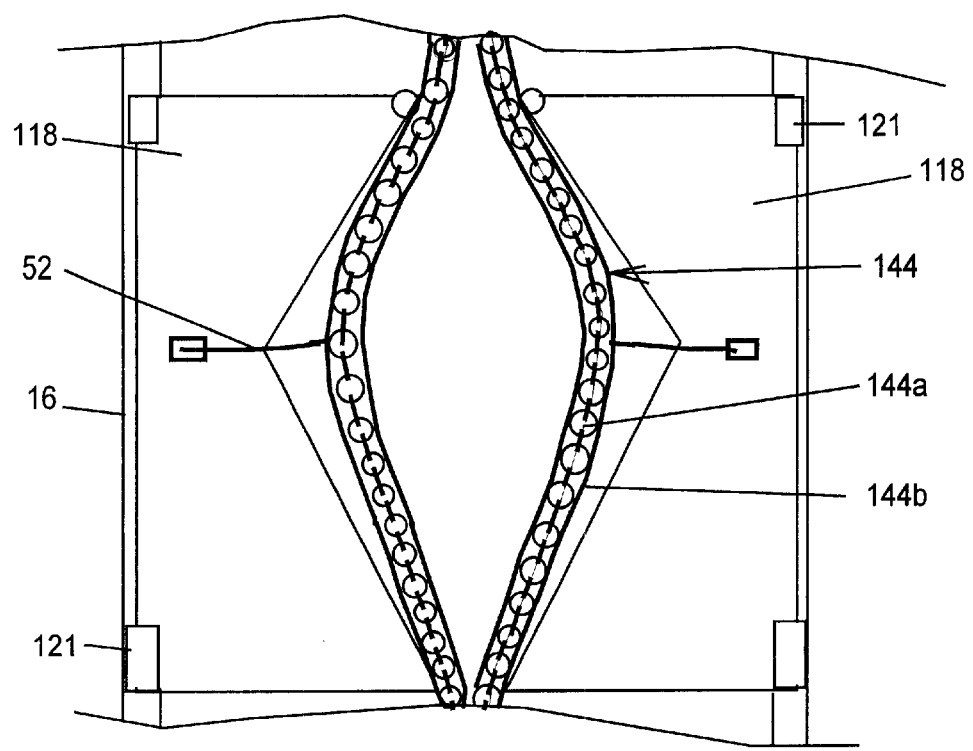
FIG. 4 shows a partial view of an alternative form of door portions carrying flexible means in the form of chains.

FIG. 4 shows parts of an embodiment which is similar to that of FIGS. 1 and 2 but which differs in the form of the door portions and the form of the flexible means. Here, the door portions 118 are formed of steel sheeting which is pressed to provide turned over flanges at its edges. The outer edges of the door portions are hinged at 121 to the side frame members 16. The flexible means 144 are provided by chains 144a, at least the main parts of which are contained inside flexible tubing provided by rubber hoses 144b. The chains have links of about ½ inch diameter, and the rubber hoses, which are about 2½ to 3 inches in diameter, are thick enough to provide a cushion between the chains and the neck of an animal.

I claim:

1. Apparatus for restraining the neck or head of a farm animal, comprising:

a fixed frame disposed in an upright plane and having a base, a top, and sides all spaced apart sufficiently for a said animal to walk through the frame, a door portion hinged to each opposite side of said fixed frame so as to hinge about a vertical axis, and such that said door portions allow animals to walk through the apparatus when the gate portions are swung outwardly from the plane of the frame, said door portions having upper and lower corners which are adjacent each other when the door portions are in a closed position aligned with the frame, said upper and lower corners being respectively above and below the head and neck positions of an animal to be treated, the door portions having recessed parts intermediate the height of said upper and lower corners and which, when the door portions are closed, are spaced apart sufficiently that an animal can place its head or neck between said recessed parts;

two flexible means each connected at a lower end to a lower corner of one of the door portions and, at its upper end, each being located by guide means carried adjacent one of said upper corners of the door portions, said flexible means each including a side portion extending between said upper and lower corners of one of said door portions and each connected to outer parts of a door portion or to the adjacent frame by extensible means tending to hold said side portions apart, said side portions having their upper ends connected to the top of the frame via fluid cylinder means capable of tensioning the flexible means to pull upper portions of the flexible means upwardly through the guide means when the door portions are closed thus tensioning the side portions of the flexible means, whereby, when an animal has placed its head between said side portions of the flexible means, these side portions can be pulled inwardly towards each other by vertical movement of said cylinder means to bring said side portions against the sides of the animal's neck or head, and whereby, upon release of tension by the fluid cylinder means, the door portions can be swung open to allow the animal to proceed through the frame;

and wherein said cylinder means is disposed so that when retracted it exerts a component of force tending to close the door portions when these portions have been opened to allow an animal to pass through, whereby after the animal is treated and the tension applied by the cylinder means has been relaxed to allow the door portions to open, the cylinder may be re-energized to close the door portions.

2. Apparatus according to claim 1, further comprising a latch for normally holding said door portions in the closed condition and adapted to latch automatically when these portions close, and foot operated means for releasing said latch and allowing said door portions to open and an animal to proceed through the frame.

3. Apparatus according to claim 1, wherein said cylinder means includes a first, generally vertical cylinder for pulling the flexible means upwardly, said first cylinder being mounted on means movable by second cylinder means in a horizontal direction, whereby the first cylinder means can be moved outwardly from the frame by the second cylinder means.

4. Apparatus for restraining the neck or head of a farm animal, comprising:

a fixed frame disposed in an upright plane and having a base, a top, and sides all spaced apart sufficiently for a said animal to walk through the frame, a door portion hinged to each opposite side of said fixed frame so as to hinge about a vertical axis, and such that said door portions allow animals to walk through the apparatus when the gate portions are swung outwardly from the plane of the frame, said door portions having upper and lower corners which are adjacent each other when the door portions are in a closed position aligned with the frame, said upper and lower corners being respectively above and below the head and neck positions of an animal to be treated, the door portions having recessed parts intermediate the height of said upper and lower corners and which, when the door portions are closed, are spaced apart sufficiently that an animal can place its head or neck between said recessed parts;

two flexible means each connected at a lower end to a lower corner of one of the door portions and, at its upper end, each being located by guide means carried adjacent one of said upper corners of the door portions, said flexible means each including a side portion extending between said upper and lower corners of one of said door portions and each connected to outer parts of a door portion or to the adjacent frame by extensible means tending to hold said side portions apart, said side portions having their upper ends connected to the top of the frame via fluid cylinder means capable of tensioning the flexible means to pull upper portions of the flexible means upwardly through the guide means when the door portions are closed thus tensioning the side portions of the flexible means, whereby, when an animal has placed its head between said side portions of the flexible means, these side portions can be pulled inwardly towards each other by vertical movement of said cylinder means to bring said side portions against the sides of the animal's neck or head, and whereby, upon release of tension by the fluid cylinder means, the door portions can be swung open to allow the animal to proceed through the frame and wherein said flexible means are belts provided with at least one aperture for allowing treatment of an animal at a specific location determined by the position of the aperture.

5. Apparatus according to claim 1, wherein said side portions extend between lower inner corners of said door portions which are between 12 and 30 inches above ground level, and upper inner corners of said door portions which are between 4 and 7 feet above ground level.

6. Apparatus according to claim 1, a wherein said flexible means are chains which are contained within tubing at least where they contact an animal.

* * * * *